UNITED STATES PATENT OFFICE.

CAMILLE A. FAURE, OF NEW YORK, N. Y.

PROCESS OF OBTAINING ALUMINIUM CHLORIDE.

SPECIFICATION forming part of Letters Patent No. 385,345, dated July 3, 1888.

Application filed February 20, 1888. Serial No. 264,646. (No specimens.)

*To all whom it may concern:*

Be it known that I, CAMILLE A. FAURE, a citizen of the Republic of France, residing in the city, county, and State of New York, have invented certain new and useful Improvements in the Method of Producing Aluminium Chloride, of which the following is a full, clear, and exact description.

My invention is an improvement in the art of producing chloride of alumina.

The object of my invention is to improve the quality, reduce the expense, and render the manufacture upon a large commercial scale practicable, desirable, and profitable.

I manufacture or produce the chloride by subjecting the oxygenated ores of aluminium to a proper combining-temperature—that is, about a red heat—bringing them into direct contact with the flame of a furnace. I then cut off the flame and access of air and introduce a gaseous mixture containing carbon and chlorine. I prefer a gaseous mixture of petroleum, or a similar hydrocarbon and hydrochloric-acid gas. There is thus produced chloride-of-alumina vapors, which are immediately condensed to the liquid state and conducted to an appropriate receptacle.

I am aware that heretofore it has been proposed to heat fragments of aluminous ores and carbon mixed, and then pass over the heated matter a vapor containing chlorine gas. This has been attempted both in retorts and in furnaces, where the entire mass was subjected to heat.

I am also aware that it has been proposed to heat alumina in a tube and to then pass over a mixture of hydrochloric gas and sulphide of carbon; but these methods all fall far short of a successful commercial process, in that they are uncertain, unreliable, expensive, and necessarily confined to operations upon a small experimental scale.

Having described my improved process, what I claim, and desire to secure by Letters Patent, is—

1. The process of manufacturing chloride of alumina, which consists in heating an ore containing aluminium in direct contact with the flame of a furnace, cutting off the flame, passing over the heated ore a gaseous mixture containing a hydrocarbon vapor and a gas containing chlorine, and then condensing the resulting vapor.

2. The process of manufacturing aluminium chloride, consisting in heating the aluminium ore to a proper combining-temperature, passing over the heated ore a mixture of hydrochloric acid gas and hydrocarbon vapor, and then condensing the resulting vapor.

3. The process of manufacturing aluminium chloride, consisting in heating the aluminium ore to a proper combining-temperature, cutting off the flame, passing over the heated ore a gaseous mixture containing carbon and chloride, and then condensing the resulting vapor.

CAMILLE A. FAURE.

Witnesses:
    DANIEL E. DELAVAN,
    WM. B. VANSIZE.